US006328131B1

United States Patent
Backus (10) Patent No.: US 6,328,131 B1
(45) Date of Patent: Dec. 11, 2001

(54) ROLL-UP TREE SEAT

(76) Inventor: Bradly L Backus, 29850 Country Route 179, P.O. Box 64, Chaumont, NY (US) 13622

( * ) Notice: Subject to any disclaimer, the term of this patent is extended or adjusted under 35 U.S.C. 154(b) by 0 days.

(21) Appl. No.: 09/548,096

(22) Filed: Apr. 12, 2000

(51) Int. Cl.$^7$ ................................. E04G 3/00
(52) U.S. Cl. ........................... 182/187; 182/188
(58) Field of Search ................ 182/92, 150, 187, 182/206, 188

(56) References Cited

U.S. PATENT DOCUMENTS

| | | | | |
|---|---|---|---|---|
| 882,850 | * | 3/1908 | Troell | 182/187 |
| 2,722,968 | * | 11/1955 | Smith | 182/187 |
| 3,115,213 | * | 12/1963 | Cloutier | 182/187 |
| 3,340,828 | * | 9/1967 | Smith et al. | 182/187 |
| 3,419,108 | * | 12/1968 | Mobbs | 182/187 |
| 3,749,200 | * | 7/1973 | Meyer | 182/187 |
| 3,927,733 | * | 12/1975 | Wurn et al. | 182/187 |
| 3,992,055 | * | 11/1976 | Shaw et al. | 182/187 |
| 4,150,733 | * | 4/1979 | Plummer | 182/187 |
| 4,221,429 | * | 9/1980 | Wade | 297/277 |
| 4,315,655 | * | 2/1982 | Machnik | 182/187 X |
| 4,459,713 | * | 7/1984 | Fry | 5/211 |
| 4,536,026 | * | 8/1985 | Cornell | 297/39 |
| 4,549,635 | * | 10/1985 | Early | 182/187 |
| 5,293,657 | * | 3/1994 | DeAth | 5/127 |
| 5,458,215 | * | 10/1995 | Burgin | 182/187 |
| 5,544,793 | * | 8/1996 | Harrop | 224/645 |
| 5,842,541 | * | 12/1998 | Arcuri | 182/187 |
| 6,003,173 | * | 12/1999 | Meoli, Jr. et al. | 5/120 |

* cited by examiner

Primary Examiner—Bruce A. Lev
(74) Attorney, Agent, or Firm—Michael I. Kroll (57) ABSTRACT

A roll-up tree seat consisting of a tree strap for anchoring the back end of the seat, a snap on metallic link to connect the seat back to the tree strap, the seat itself, and an adjustable telescopic front support pole which hooks into the front of the seat at one end, the opposite end of the pole resting against the tree trunk. The seat can be adjusted not only for height but also for tautness by extending or retracting the pole.

11 Claims, 9 Drawing Sheets

ROLL-UP TREE SEAT

BACKGROUND OF THE INVENTION

1. Field of the Invention

The present invention relates generally to seating devices and, more specifically, to static tree suspended seating devices. Devices in this field do not vary greatly in terms of form and function. If the class of non-static tree suspended seating is eliminated, such as swings, most static tree seats are of rigid construction, somewhat heavy and bulky. Certainly none are small enough to be classified as pocketable. The present invention, the Roll-up Tree Seat, is the exception to this characterization. It is a lightweight, strong, durable tree seat that is small enough when rolled up for carrying and storage, to fit into some pockets and easily into any backpack. In form and function, the tree seat is similar to a small hammock: a triangular-shaped sling constructed of nylon or similar material suspended between two rigid supports. Its unique construction is highly appropriate to its intended use as a hunter or camper seat. The seat must be used with both feet on the ground for stability, since the front of the sling is supported by a single telescopic pole which is free to pivot on the pointy end that rests against the tree trunk. While this might be a handicap in a seat such as a lounge chair, it is apropos for such dynamic activities as hunting or camping which require that both feet be literally on the ground.

The roll-up tree seat consists of 4 basic components. Shown is a tree strap wrapped around a proximate tree for anchoring the back end of the seat; a snap on metallic link to connect the seat back and the tree strap; the seat itself, and an adjustable telescopic front support pole which hooks into the front of the seat one end and rests against the tree trunk at the pointed end. The seat can be adjusted not only for height but also for more or less tautness by extending or retracting the pole respectively and/or decreasing or increasing the distance between the seat back attachment point and the position of the pointed end of the pole respectively. This corresponds to its appropriateness of use in either a hunting scenario where alertness is required or to a more relaxed camping situation.

The tree strap is sufficient for most seat anchoring situations including utilizing trees up to 3 feet in diameter. The buckle is a spring-loaded locking type that assures a secure anchoring means. The strap is wound about the tree trunk at least twice, at a height appropriate to the user and tightened with the link secured to it. The seat back, a folding metal bracket assembly into which the seat strapping material is secured, is attached, in turn, to the link. The strapping material consist of 3 straps attached to one half of the folding bracket, looped together through a one strap width aperture in the front seat bracket and attached symmetrically to the other half of the folding bracket. This arrangement results in a triangular shaped hammock-like seat consisting of 6 straps with two cross straps added for lateral support. The front seat bracket has a hole in it which attaches to the hooked upper end portion of the telescoping, front seat, support pole.

With its unique character and many advantages over prior art, the present invention is truly the ultimate portable tree seat.

2. Description of the Prior Art

There are other portable seating devices designed for hunting and camping. Typical of these is U.S. Pat. No. 5,427,344 issued to David G. Beauchemin on Jun. 27, 1995.

Another patent was issued to Marvin Berk on Jun. 27, 1995 as U.S. Pat. No. 5,427,575. Yet another U.S. Pat. No. 3,937,463 was issued to Donald R. Soisson on Feb. 10, 1976 and still yet another was issued on Nov. 26, 1991 to Wen-Guo Tsai as U.S. Pat. No. 5,067,706.

Another patent was issued to Tony Chang on Aug. 24, 1993 as U.S. Pat. No. 5,238,456.

A portable hanging shelf system is disclosed wherein one or more shelves are suspended in a horizontal position from generally vertical objects of varying diameter. A non-elastic flexible fabric belt encircles generally vertical objects of varying diameters, such as a tree trunk, and an adjustable lever-type buckle on the belt releasably grips and applies tension in the encircled portion of the belt to firmly secure a pair of brackets to the curved surface of the vertical object. A cord is connected to each bracket and forms a loop which receives one or more flat rectangular shelves. The cords pass through slots at the opposed ends of each shelf and the shelves are secured in an adjustable horizontal position at the desired height above the ground by a cord lock or by passing the cord through additional slots. Because the top ends of the cords are very close to the vertical object, when weight is placed on the shelf, the center of gravity of the shelf is spaced horizontally outward from its point of suspension and the resultant weight force causes the shelf to press firmly inward against the vertical object. All the components can be stored in a compact configuration and are easily transported in a backpack. The portable shelf system eliminates the need for nails or screws to be driven into trees and is particularly useful for campers and back-packers.

Toteable swings with a variety of seats designed in characterized form appealing to children come in kits. The swings are highly portable, light weight, and easily carried by children. The swings are designed to be taken along on family outings and can be used wherever there is a suitable tree limb or an appropriate stand. The swing kit includes a designed seat and a nylon rope with a beaded end used for securing the seat and swing and for adjusting swing height for the individual using the swing. Changeable seats are supplied in a variety of flattened characterized seat designs, a half moon and face shape, a baseball and mitt, a flattened friendly elephant, and a mischievous dinosaur. Other designs can be added.

A swing for both arcuate and rotational motion has a disc platform for passengers and multiple, congruently attached support strands adapted for securing to a horizontal support member. The bight of a strand passes around the support member such that two free ends of the strand may pass through the disc to lock as to adjustably secure the ends to the disc. The strand pairs are fixed to the horizontal support member at spaced positions on the member congruent with the position of the strands on the disc. The disc is provided with a peripheral rim having top and bottom walls. Extending through the walls is a plurality of spaced apart vertical apertures. The lower wall is provided with a depression placed adjacent each aperture. Extending across the depression and spaced from the bottom of the depression is a rigidly attached lock bar. The disc platform is swingedly attached to the support by passing each end of each strand pair through a vertical aperture and each end is then passed between the bottom of the depression and the lock bar and anchored at that point.

A multiple-purpose playing set includes a basic seat supported on a rope secured to a ceiling or a frame for serving as a swing, a longitudinal plate having a central portion engageable with the basic seat for serving as a seesaw, a basin having a central portion engageably mounted on the basic seat for serving as a cradle, and at least a bar tied on the rope for serving as a high bar or as a ladder. The longitudinal plate may also be inclinedly secured on the rope having an upper end portion of the rope fixed on an upper frame or a ceiling and having a lower end portion of the rope fixed on a bottom wall or a floor for serving as a slide A reinforced swing seat includes a swing seat having a pair of reinforcing members embedded in two opposite end portions of the swing seat, each reinforcing member make of reinforced engineering plastic material and integrally molded and combined with an intermediate strap portion disposed between the two opposite end portions of the seat and each reinforcing member having a plurality of stabilizing stems respectively protruding upwardly and downwardly from the reinforcing member to increase its cross linking and binding with the swing seat also made of plastic material but with lower cost when integrally molded together, thereby providing a swing seat having proper tensile strength and reasonable cost.

While these suspended tree platform devices may be suitable for the purposes for which they were designed, they would not be as suitable for the purposes of the present invention, as hereinafter described.

SUMMARY OF THE PRESENT INVENTION

The present invention discloses a roll-up tree seat. The roll-up tree seat consists of four basic components comprising a tree strap wrapped around a proximate tree for anchoring the back end of the seat, a snap-on metallic link to connect the seat back and the tree strap, the seat itself, and an adjustable telescopic front support pole which hooks into the front of the seat at one end and rests against the tree trunk at the pointed end. The seat can be adjusted not only for height but also for more or less tautness by extending or retracting the pole respectively and/or decreasing or increasing the distance between the seat back attachment point and the position of the pointed end of the pole respectively.

A primary object of the present invention is to provide a tree seat that is very easily portable.

Another object of the present invention is to provide a tree seat that is light weight.

Still yet another object of the present invention is to provide a tree seat that is strong.

Still yet another object of the present invention is to provide a tree seat that is durable.

Yet another object of the present invention is to provide a tree seat that has the least volume when disassembled.

Still yet another object of the present invention is to provide a tree seat that is easily adjustable for height.

Yet another object of the present invention is to provide a tree seat that is easily adjustable for comfort.

Yet another object of the present invention is to provide a high quality, highly portable tree seat at a reasonable price.

Additional objects of the present invention will appear as the description proceeds.

The present invention overcomes the shortcomings of the prior art by providing a light weight, strong, durable and highly portable tree seat that is small enough when rolled up for carrying and storage, to fit into a large coat pocket or into any backpack. In form and function, the tree seat is similar to a small hammock: a triangular-shaped sling constructed of nylon or similar material suspended between rigid supports. This unique construction is highly advantageous for its intended use as a hunter or camper's seat. The seat must be used with both feet on the ground for stability, since the front of the sling is supported by a single telescopic pole which is free to pivot on the pointy end that rests against the tree trunk. While this might be a handicap in a more leisurely type of seat such as a lounge chair, it is highly appropriate for dynamic activity such as hunting or camping that requires both feet to be literally on the ground.

The Roll-up Tree Seat consists of 4 basic components: 1. A tree strap for anchoring the back end of the seat; 2. A carabiner, a snap on metallic linking device to connect the seat back and the tree strap; 3. The seat itself, and 4. An adjustable telescopic front support pole which hooks into the front of the seat at one end and rests against the surface of the tree trunk at the other pointy end. The seat can be adjusted with respect to its compliance, i.e., the springy factor that gives the seat its ability to conform to the contour of an object placed upon it. By extending the pole to its maximum dimension and/or decreasing the distance between the upper seat back attach point and the position of the pointy end of the pole the seat becomes less compliant or more rigid. This is appropriate for maintaining an alert attitude such as in a hunting scenario. Conversely, a more compliant seat configuration appropriate to a more relaxed camping situation can be achieved by placing the end of the support pole in a relatively lower position against the tree trunk (with respect to the back seat attach point) and/or by decreasing the length of the pole.

The tree strap is preferably approximately 10 feet long, which is sufficient for most seat anchoring situations, which includes utilizing trees up to 3 feet in diameter. The buckle is preferably of a spring-loaded locking type which assures a secure anchoring means. The strap is wound about the tree trunk at least twice, at a height appropriate to the user and tightened just enough to allow the carabiner to be secured to it. The seat back is a folding metallic bracket assembly approximately 16" long unfolded into which the nylon or similar seat strapping material is secured. It is attached in turn to the carabiner and is thus attached to the tree with the tree strap. The seat strapping material consist of 3 straps approximately 2" wide×38" long that are attached to one half of the folding bracket, looped through a 2" wide aperture in the front seat bracket and attachment symmetrically to the other half of the folding seat bracket. This arrangement results in a triangular shaped hammock seat consisting of 6 straps with two cross straps added for lateral support. The front bracket has a hole into which is fit the attachment hook found at the upper end of telescoping front seat support pole.

From the above description it can be seen that the advantages of the present invention, The Roll-up Tree Seat, over prior art places it truly in a class by itself as the ultimate portable tree seat.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

DESCRIPTION OF THE PREFERRED EMBODIMENT(S)

In order that the invention may be more fully understood, it will now be described, by way of example, with reference to the accompanying drawings in which FIGS. 1 through 9 illustrate the present invention being a roll-up tree seat.

Figure 1:
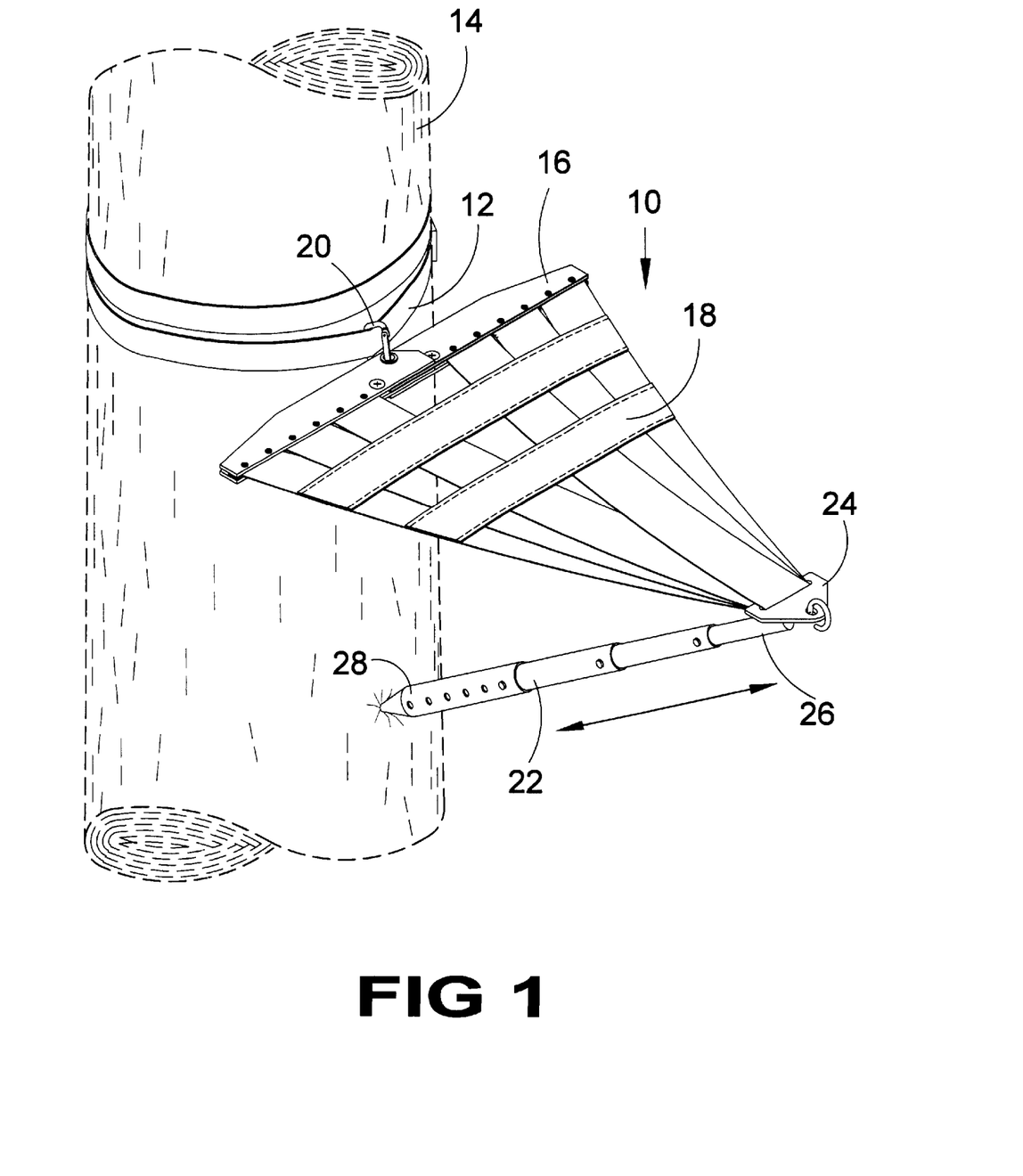
FIG. 1 is a perspective view of the present invention, The Roll-up Tree Seat on site and setup for use.

Turning to FIG. 1, shown therein is a perspective view of the present invention 10 being a roll-up tree seat in operative connection. The roll-up tree seat consists of four basic components. Shown is a tree strap 10 wrapped around a proximate tree 14 for anchoring the back end 16 of the seat 18; a snap on metallic link 20 to connect the seat back 16 and the tree strap 12; the seat 18 itself, and an adjustable telescopic front support pole 22 which hooks into the front 24 of the seat 18 at one end 26 and rests against the tree trunk 14 at the pointed end 28. The seat 18 can be adjusted not only for height but also for more or less tautness by extending or retracting the pole 22 respectively and/or decreasing or increasing the distance between the seat back 16 attachment point and the position of the pointed end 28 of the pole 22 respectively.

Figure 2:
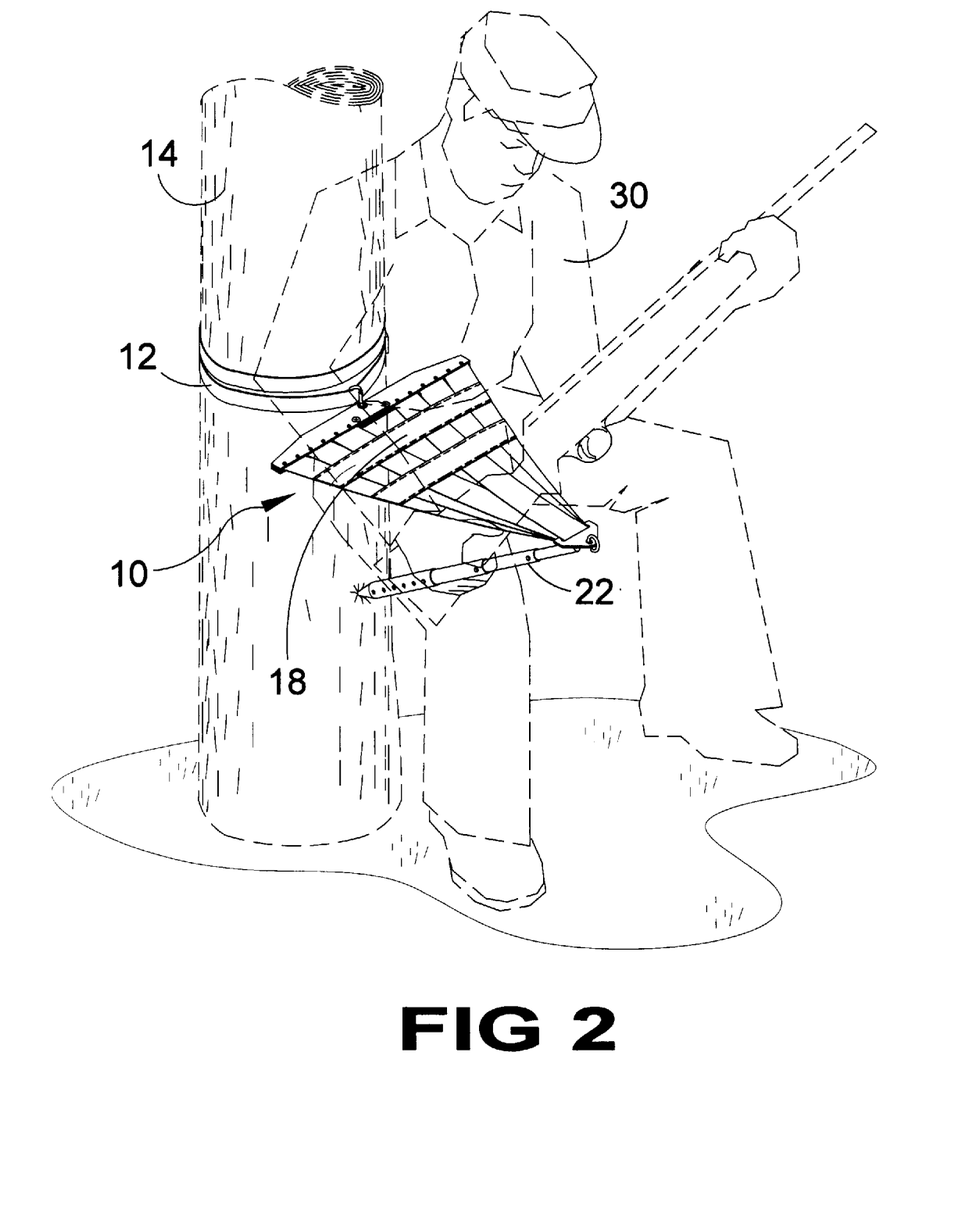
FIG. 2 is a perspective view of the present invention, The Roll-up Tree Seat showing it in use by a hunter in a typical scenario.

Turning to FIG. 2, shown therein is a perspective view of the present invention 10 showing it in use by a hunter 30 in a typical use scenario. Elements previously disclosed are also shown.

Figure 3:
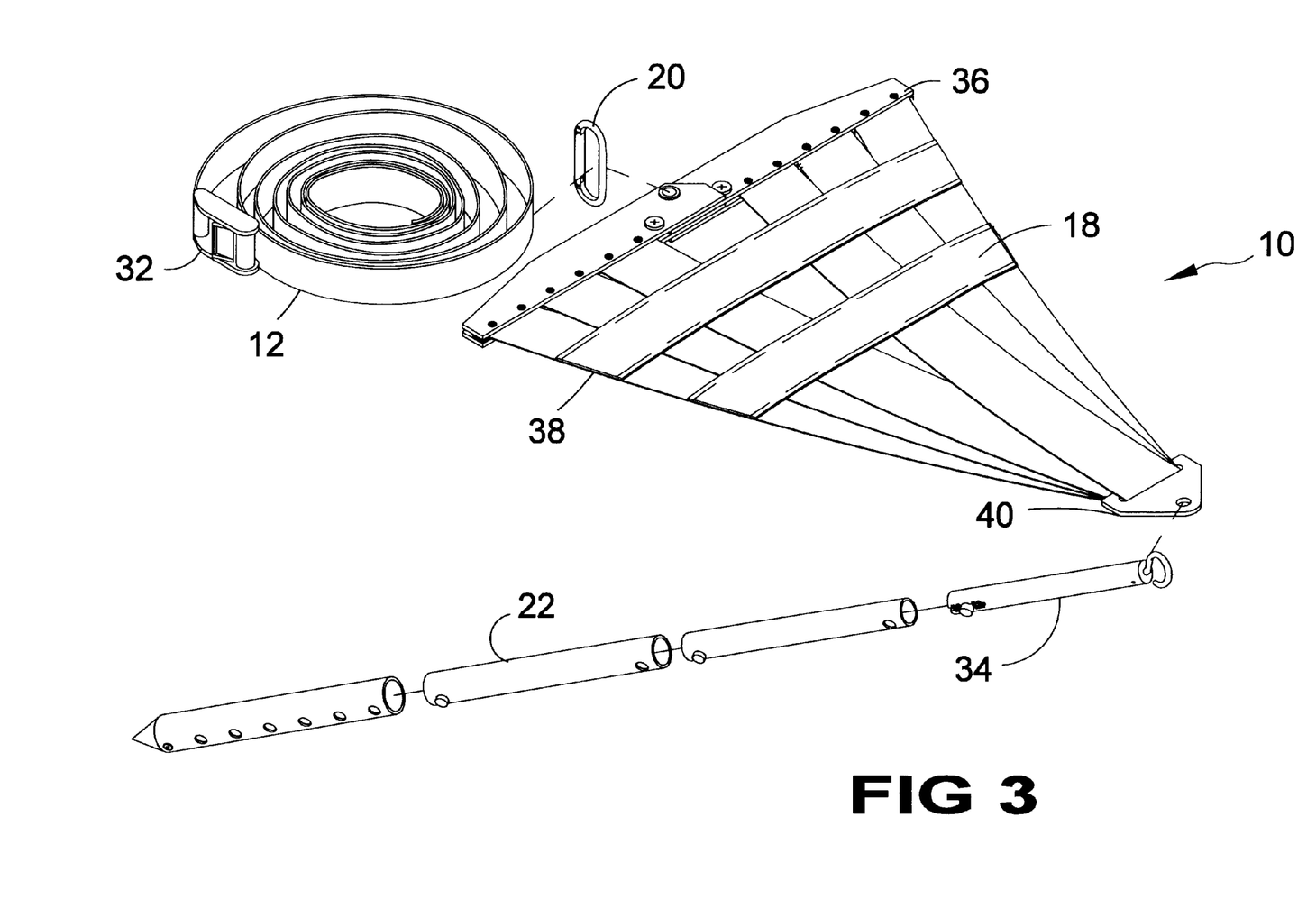
FIG. 3 is a perspective view of the present invention, The Roll-up Tree Seat, disassembled into its 4 basic sub units: the tree strap, the carabiner (a snap-on link), the seat and the telescoping front support pole (shown here separated into its telescopic sleeve components).

Turning to FIG. 3, shown therein is a perspective view of the present invention 10 disassembled into its 4 basic sub units: the tree strap 12 with spring-loaded locking buckle 32, the carabiner 20 (a snap-on link), the seat 18 and the telescoping front support pole 22 (shown here separated into its telescopic sleeve components 34). Also shown is the folding seat bracket 36, seat webbing 38 and seat end support connecting means 40.

Figure 4:
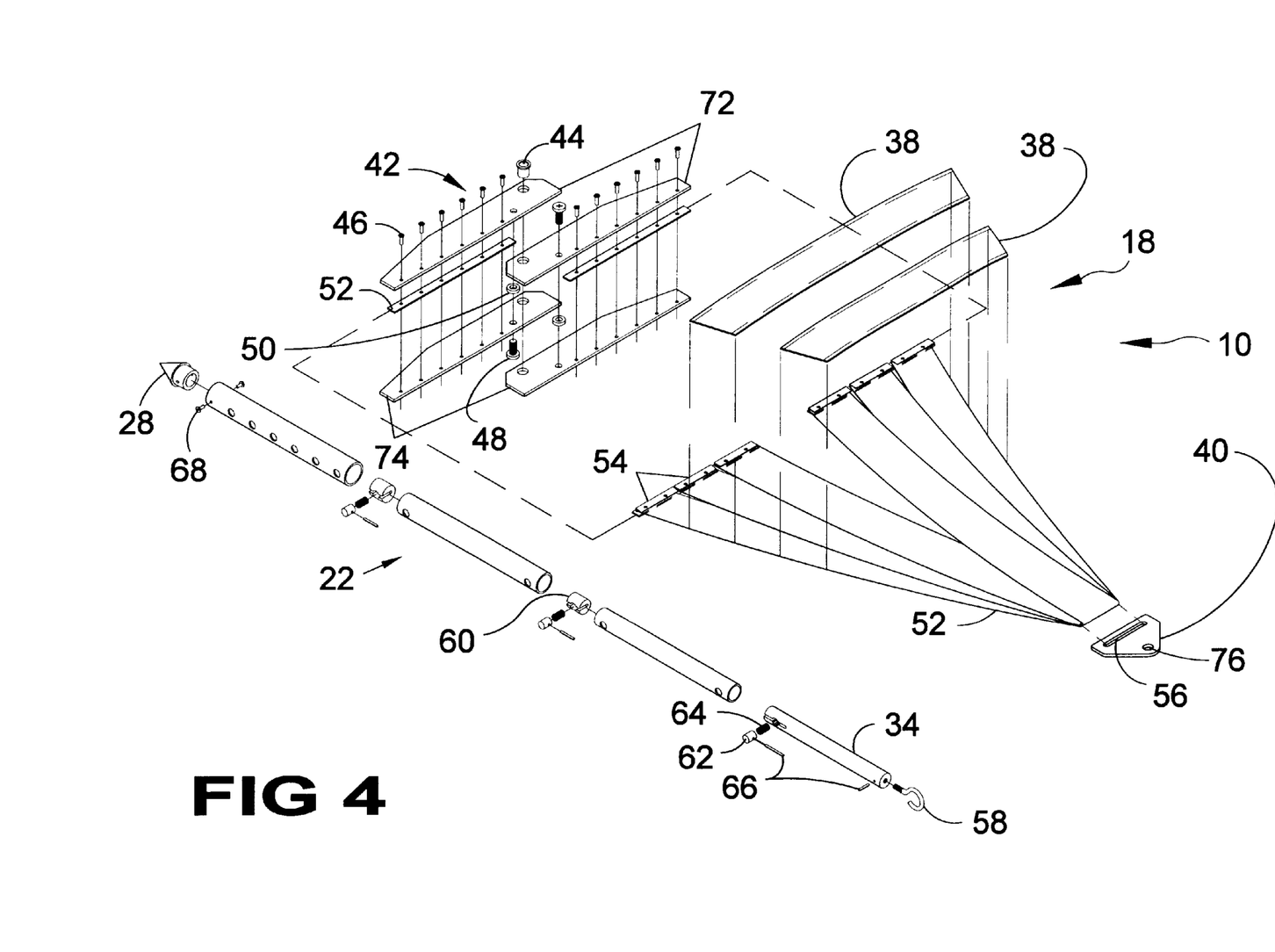
FIG. 4 is an exploded perspective view of the 2 main subassemblies of the present invention, the seat assembly and the telescoping sleeve assemblies of the front support pole.

Turning to FIG. 4, shown therein is an exploded perspective view of the two main subassemblies of the present invention 10, the seat assembly 18 and the telescoping sleeve assemblies of the front support pole 22. Shown is the exploded folding seat bracket assembly 42 held together by a central large rivet 44, multiple smaller rivets 46 having a pair of stop screws 48 with stop washers 50 securely holding therein a pair of strapping anchor strips 52 between a pair of upper members 72 and a pair of lower members 74. Also shown are the cross straps 38, three continuous seat straps 52 having multiple anchor strips 54 on its ends and seat end attachment 40 having a belt-width aperture 56 therein wherein straps 52 overlap each other. Also shown is pole 22 with multiple telescoping seat supports sleeves 34 with a hook means 58 on one end along with a button assembly housing 60 containing a button 62 and spring 64. Also shown are roll pins 66 along with a pointed tip 28 with attachment means 68. Aperture 76 receives hook means 58 whereby pole 22 is secured to support connecting means 40. The rear 16 of the seat 18 is wider than the front end 24 being about six strap widths wide with the strap ends lying side by side adjacent each other between upper members 72 and lower members 74.

Figure 5:
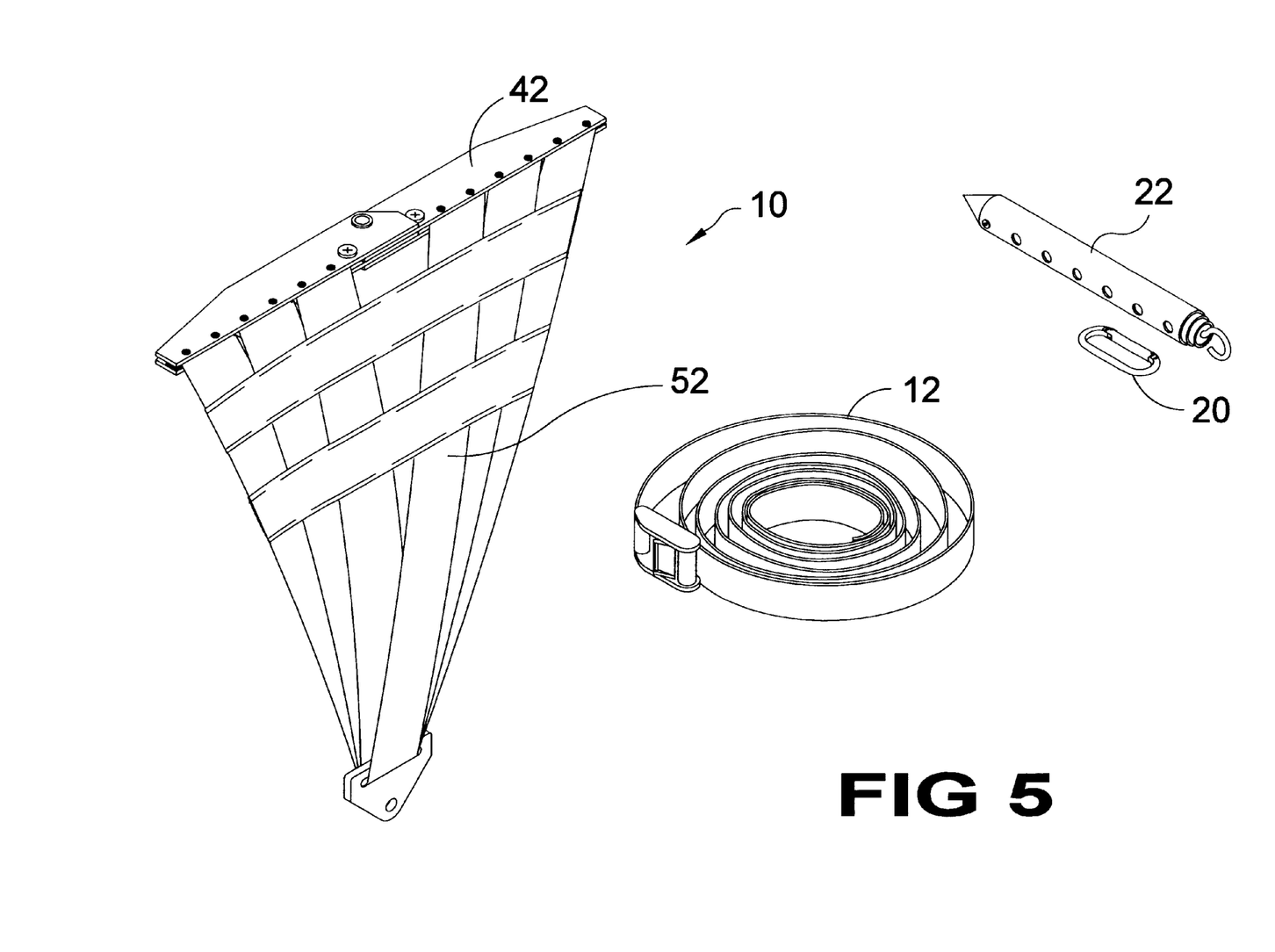
FIG. 5 is a perspective view of the present invention in the first stage of the rolling up process indicating that the seat bracket should be horizontal while the strapping assembly hangs vertically.

Turning to FIG. 5, shown therein is a perspective view of the present invention 10 in the first stage of the rolling up process indicating that the seat bracket 42 should be horizontal while the strapping assembly 52 hangs vertically downward. Also shown are tree straps 12 with link 20 and pole 22 in a folded position.

Figure 6:
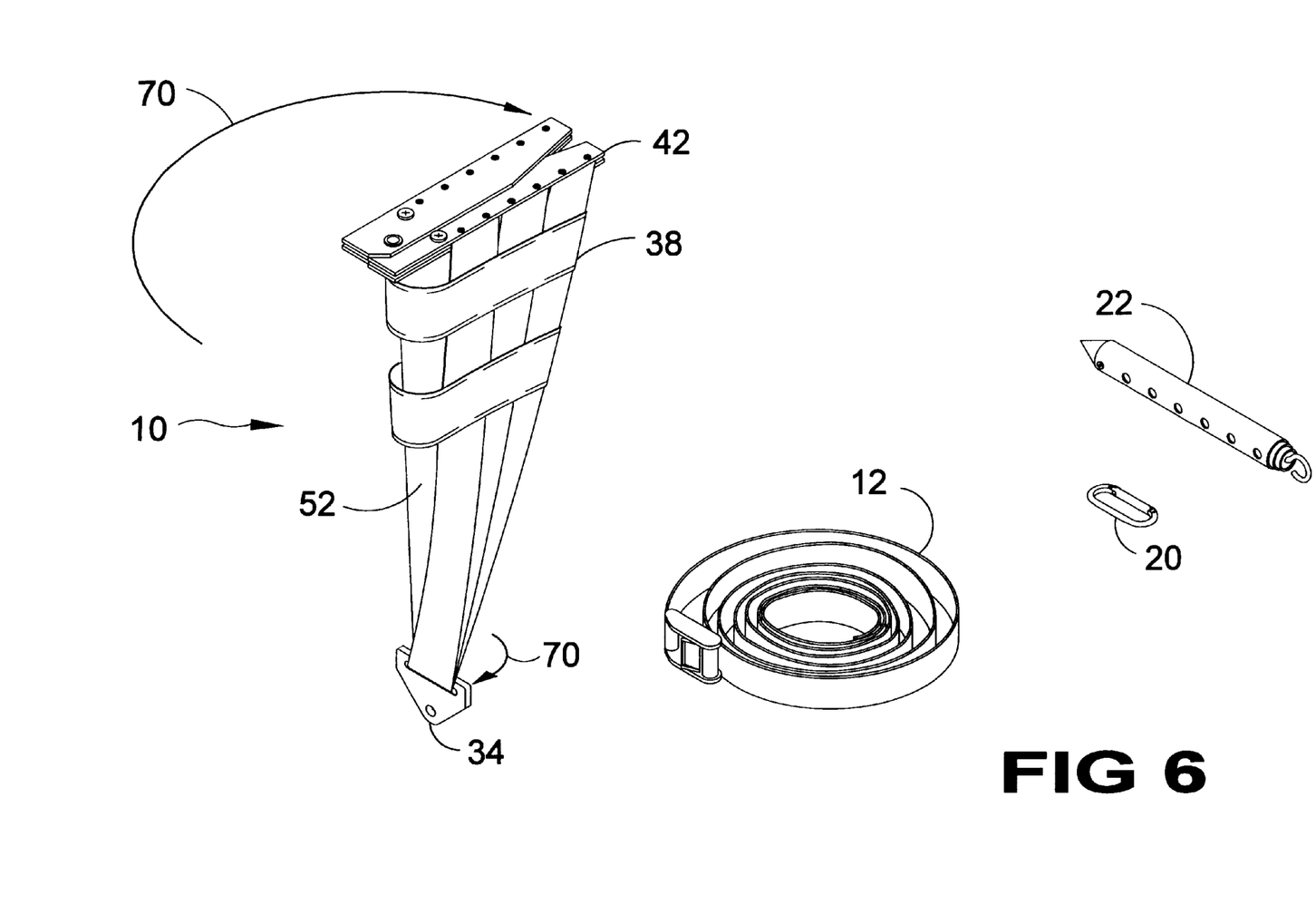
FIG. 6 is a perspective view of the present invention in the second stage of the rolling up process showing the seat bracket folded while still in the horizontal plane and the strapping assembly hanging vertically, noting how the front seat bracket twists 90° counterclockwise (looking down) as the seat bracket is folded.
Figure 7:
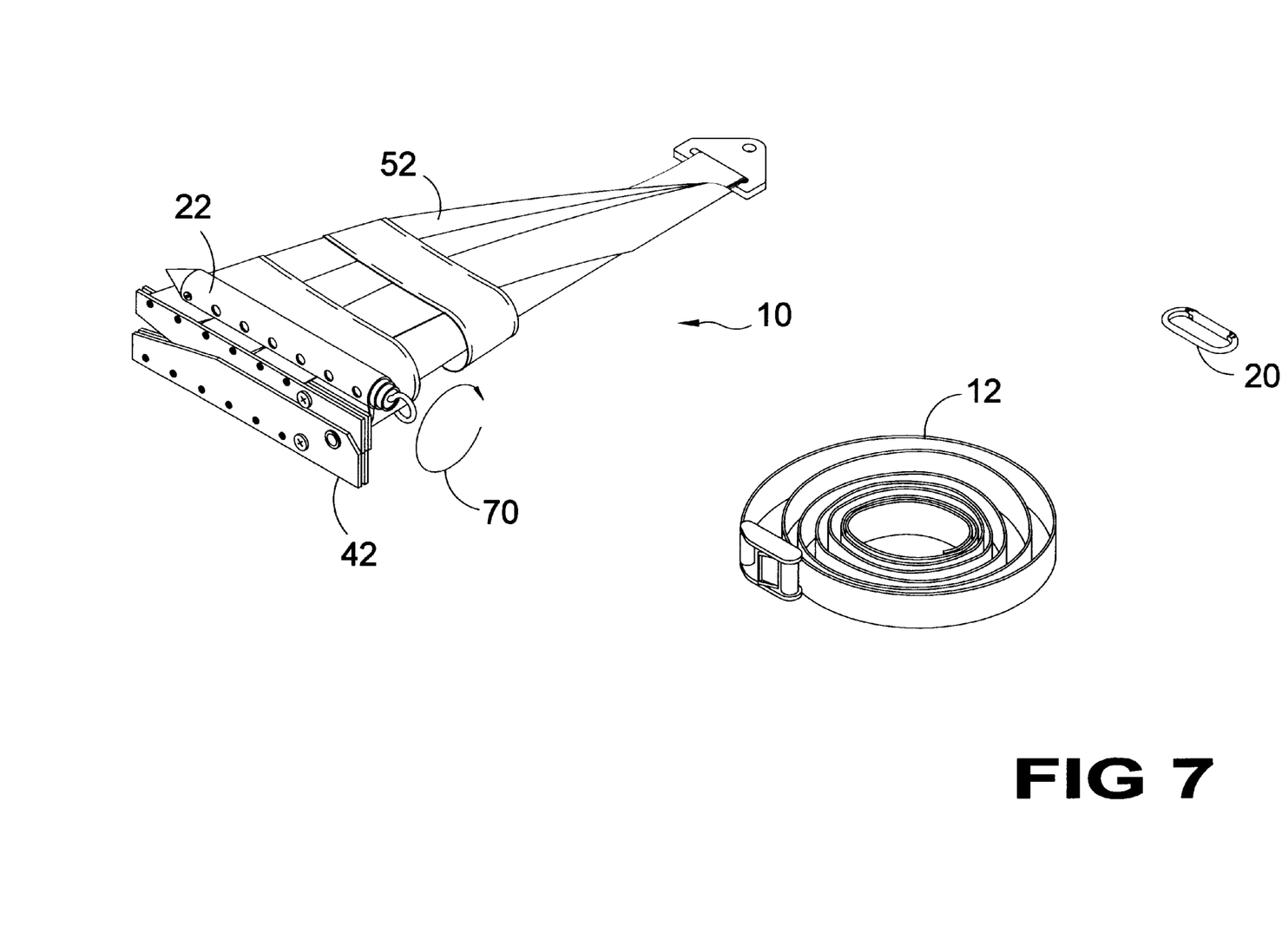
FIG. 7 is a perspective view of the present invention in the third stage of the rolling up process showing the folded seat bracket and strapping assembly lying flat on a surface with the collapsed telescoping pole placed on the strapping near the folded bracket. Note the front seat bracket is now twisted 180° counterclockwise so that there are no twists in the strapping material. The seat assembly is now correctly configured prior to being rolled up. Also shown is the direction of the rolling process, indicating that the pole and the folded bracket are to be encircled by the strapping material in the rolled up configuration.

Turning to FIG. 6, shown therein is a perspective view of the present invention 10 in the second stage of the rolling up process showing the seat bracket 42 folded while still in the horizontal plane and the strapping assembly 52 hanging vertically, noting how the front seat bracket rotates 90° counterclockwise as shown by direction arrow 70 (looking down in the vertical plane) as the seat bracket 42 is folded. Elements previously disclosed are also shown Turning to FIG. 7, shown therein is a perspective view of the present invention 10 in the third stage of the rolling up process showing the folded seat bracket 42 and strapping assembly 52 lying flat on a surface with the collapsed telescoping pole 22 placed on the strapping near the folded bracket 42. Note the front seat bracket is now twisted 180° counterclockwise so that there are no twists in the strapping material. The seat assembly is now correctly configured prior to being rolled up. Also shown is the direction of the rolling process, indicating that the pole 22 and the folded bracket 42 are to be encircled by the strapping material in the rolled up configuration. Elements previously disclosed are also shown.

Figure 8:
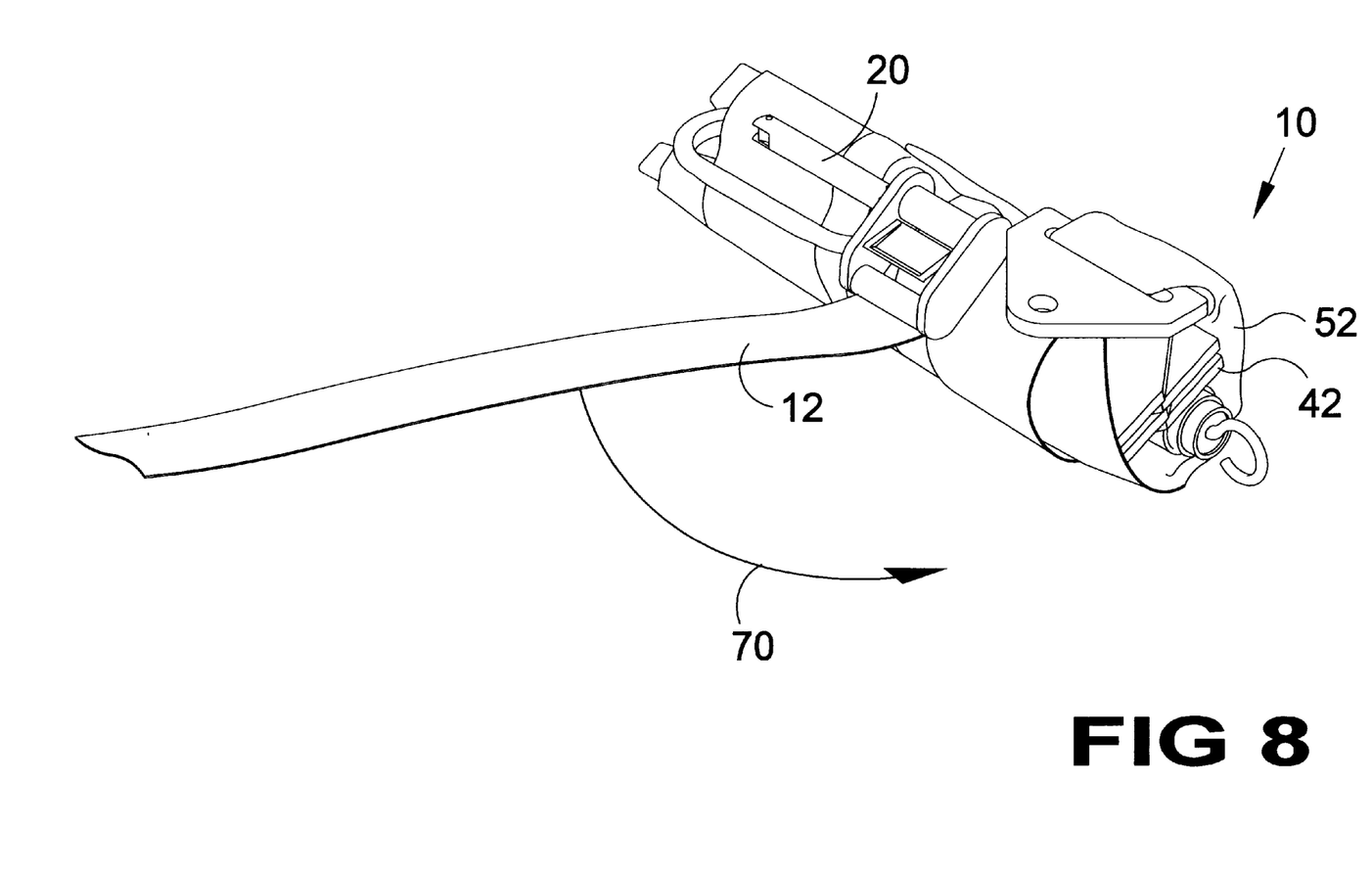
FIG. 8 is a perspective view of the present invention in the fourth stage of the roll-up process showing the assembly in the correct rolled up configuration with the front seat bracket now lying flat on the strapping material and the carabiner snapped onto the far edge of the rolled up strapping. The seat assembly is shown here ready for the last stage in the roll-up process with the tree strap in position to begin encircling the assembly.

Turning to FIG. 8, shown therein is a perspective view of the present invention 10 in the fourth stage of the roll-up process showing the assembly in the correct rolled up configuration with the front seat bracket 42 now lying flat on the strapping material 52 and the carabiner 20 snapped onto the far edge of the rolled up strapping. The seat assembly is shown here ready for the last stage in the roll-up process with the tree strap 12 in position to begin encircling the assembly as shown by arrow 70.

Figure 9:
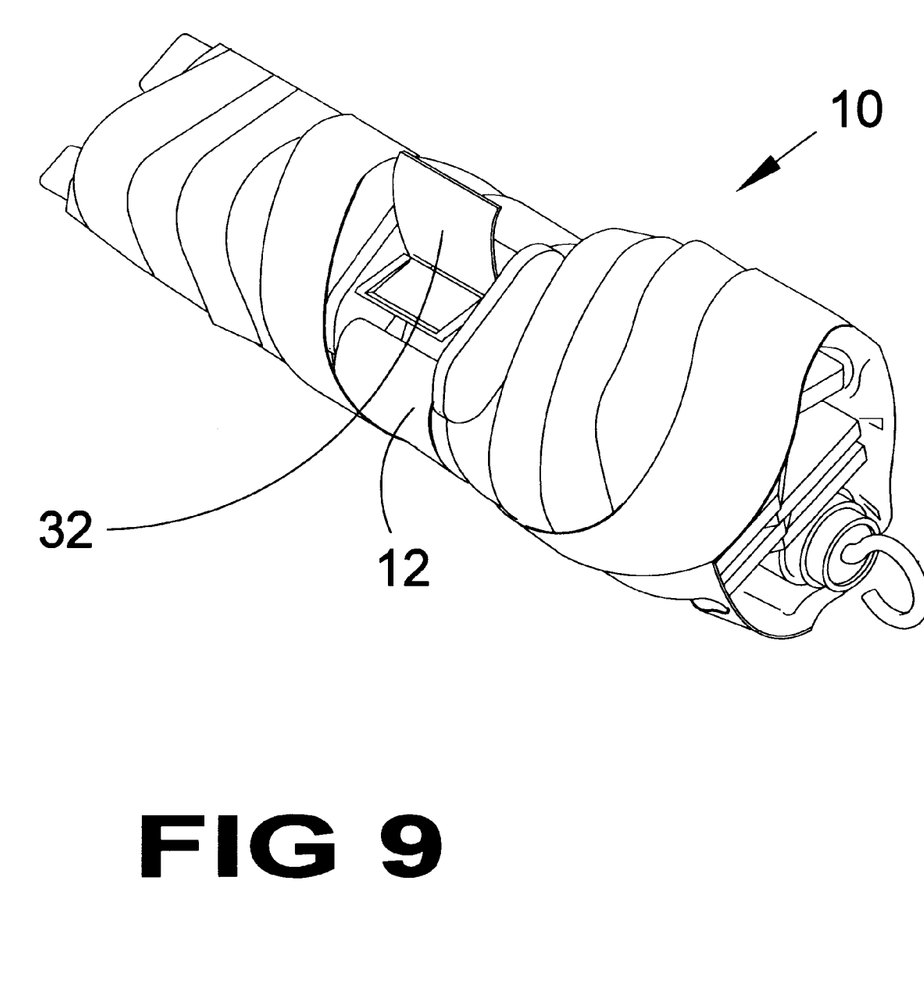
FIG. 9 is a perspective view of the present invention in the fifth and last stage of the roll-up process showing the assembly in the correct final configuration with the tree strap snugly encircling the assembly and the strap end secured tightly within the spring-loaded clamp on the strap buckle.

Turning to FIG. 9, shown therein is a perspective view of the present invention 10 in the fifth and last stage of the roll-up process showing the assembly in the correct final configuration with the tree strap 12 snugly encircling the assembly and the strap end secured tightly within the spring-loaded clamp on the strap buckle 32.

What is claimed to be new and desired to be protected by Letters Patent is set forth in the appended claims:

1. An apparatus for a seat for use by a human for attachment to a vertically standing tree, comprising:
    a) a tree strap for wrapping around the tree;
    b) a seat having a rear end, a front end, a topside, a bottomside;
    c) a first means for attachment of said seat to said tree strap;
    d) a telescoping pole disposed underneath said seat for anchoring said seat to the tree;
    e) a support connecting means having a first and a second aperture therein;
    f) a second means for attachment of said pole to said seat;
    g) said seat further comprising straps, said straps having a first and a second end;
    h) a strap cross member for support; and
    i) a folding bracket on said rear end of said seat, said bracket receiving said first end and said second end of said straps.

2. The apparatus of claim 1, said tree strap further comprising a buckle.

3. The apparatus of claim 2, wherein said buckle is spring loaded.

4. The apparatus of claim 3, further comprising a clamp, said clamp being spring loaded.

5. The apparatus of claim 1, said bracket having pivoting means for folding said bracket upon itself.

6. The apparatus of claim 5, said bracket having a pair of upper members and a pair of lower members.

7. The apparatus of claim 6, wherein said first end and said second end of said straps are disposed between said pair of upper members and said pair of lower members.

8. The apparatus of claim 7, said seat being wider at the rear end than at the front end.

9. The apparatus of claim 8, wherein said straps pass through said first aperture in said support connecting means, said straps overlapping each other.

10. The apparatus of claim 9, said second means of attachment of said pole to said seat further comprises a hook means, whereby said pole is secured to said support connecting means.

11. The apparatus of claim 10, wherein there are three straps.

\* \* \* \* \*